Figure 1:
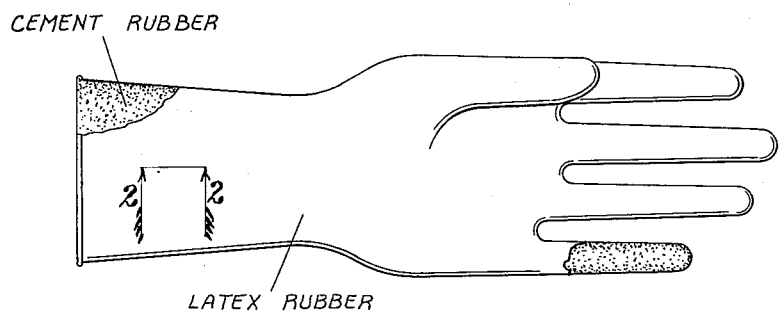

June 27, 1961  W. J. O'BRIEN ET AL  2,989,755
SURGEONS' GLOVES AND METHOD OF MAKING THE SAME
Filed Oct. 18, 1957

INVENTORS
ARMAND J. AGOSTINELLI
WILLIAM J. O'BRIEN

BY
Brumbaugh, Free, Graves & Donohue
ATTORNEYS

SURGEONS' GLOVES AND METHOD OF MAKING THE SAME

William J. O'Brien, Hamden, and Armand J. Agostinelli, East Haven, Conn., assignors to The Seamless Rubber Company, New Haven, Conn., a corporation of Connecticut Filed Oct. 18, 1957, Ser. No. 690,989
5 Claims. (Cl. 2—168)

The present invention, generally, relates to gloves and, more particularly, to an improved glove and the method of making the same.

Gloves, as for example surgeons' gloves, are made of exceedingly thin rubber so as to form a sheath like a natural skin drawn over the hand to be in close contact therewith, the object being to provide maximum tactile sensitivity for the surgeon without imparing facility of manipulation while, at the same time, protecting the patient from contamination or infection. The surgeons' gloves commonly provided are either rubber cement gloves or rubber latex gloves.

The cement gloves are made by dipping or otherwise depositing on a suitable form a solution of pure gum of dry para smoked sheet or pale crepe type, the dipping being repeated a relatively large number of times to place on the form a pure rubber deposite of sufficient thickness. Following this, the deposit is cured by subjecting the coated form to surrounding fumes of, but not limited to, sulphur monochloride and then neutralizing the rubber with ammonia, after which the glove is stripped off of the form and subjected to suitable finishing operations.

In surgeons' gloves of the latex type, the process of manufacture usually involves dipping the form or otherwise applying to the form a dispersion of natural rubber latex containing in addition to the rubber a vulcanizing agent such as sulfur with, among others, accelerator and preservative components. This is followed by applying to the form after the first dip an acid coagulant, and by alternately applying the latex and the coagulant until a deposit of the required thickness is built up on the form. Following each treatment with the coagulant, the article is washed to neutralize the coagulant and clean the outer surface of the deposit. Then, after the wall has been formed, the article is vulcanized, usually by application of heated air.

Where the glove is of the cement type, the skin of the wearer's hand is better protected from an adverse skin reaction than in the case of the latex glove. Where the glove is of latex, there may be a skin reaction of the nature of dermatitis caused by an allergy or sensitivity to the latex type coating applied to the form. Ingredients in the latex wall, which contacts the surgeon's hand, such as natural emulsifiers present in the latex, or emulsifiers used for dispersion, or additives in the dipping bath, or ingredients remaining after the coagulating steps, may cause skin irritation. In any event, gloves made wholly of latex rubber often cause skin irritation. This condition does not obtain where the glove is of cement. Moreover, where the glove is of cement, it is recognized that the wearer has greater tactile sensitivity than in the case of the latex glove and finds the glove more comfortable. On the other hand, as compared to the cement glove, the latex glove is stronger; and taking into consideration the repeated sterilizations and repeated use of the gloves for surgical purposes, has a longer useful life.

From the standpoint of the manufacturer, the latex process, as distinguished from the cement process, has distinct advantages. For example, in the latex process, only a minimum number of dips is required, whereas, in the cement process, as many as eight dips are usually required in making a sufficient coating of pure rubber. In the latex process, the use of a volatile, easily combustible solution is dispensed with, and there are other advantages.

An object of the present invention is to provide a glove in which the salient advantages of the cement glove and the latex glove are combined, while omitting or minimizing the disadvantages of these gloves pointed out above.

Among other things, an object of the invention is to provide a glove which is non-irritating to the skin and presents no allergy problem in this respect, or only a slight or lower allergy problem, the glove having high tactile sensitivity for better operational results and, as regards comfort to the wearer, being similar to the cement glove, while at the same time the glove possesses greater strength and has longer useful life than the ordinary cement or "milled" glove.

A further object is to provide a process which is practicable for the manufacture of improved gloves of a kind particularly adaptable for surgical use.

The novel glove of the present invention is one in which an inner portion is formed of rubber cement and an outer portion of rubber latex is bonded to the cement portion to provide an antiallergic glove having marked advantages over those previously known.

A method for producing this novel glove embodies, generally, the steps of depositing a coating of rubber on a glove form and depositing a rubber latex over this rubber coating. Then the glove form is vulcanized and dried. These steps will be described in greater detail presently.

In producing the glove of the present invention it was necessary to solve a number of problems which had not been solved heretofore. Among these was the procedure required to effect a firm bond between the latex portion and the cement portion, and the procedure in protecting and preventing contamination of the layer coming into contact with the skin. There was also an important problem connected with the method of curing the glove of the laminated type here presented, as will be mentioned hereinafter.

Figure 2:
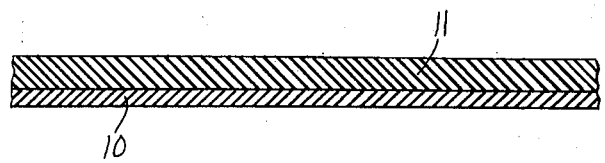

In the accompanying drawing:

FIGURE 1 is an inner face view of a glove embodying the invention with parts broken away to show the inner layer of rubber cement; and FIGURE 2 is a greatly enlarged sectional view of the glove wall taken along the line 2—2 of FIGURE 1.

In carrying out the process of the invention, the first step involves the dipping of the glove form into a bath containing, for example, a 12% solution of dry para type natural rubber in petroleum naphtha, with the addition of a very small amount of antioxidant. The antioxidant is, for example, di-beta-naphthyl-para-phenylene-diamine. In this dip or bath there are 100 parts of resilient pure gum natural rubber, and 0.5 part (one-half of one part) of the antioxidant, there being no other ingredients. After the first dip, which deposits a coating of very pure rubber on the form, the coating is partially dried. The next step is to dip the form with its rubber coating in a dip or bath containing natural latex rubber together with other ingredients. As one example the natural latex dip may have the following formulation:

EXAMPLE 1

*Outside natural latex dip*

| | Parts |
|---|---|
| Type 957 latex | 100 |
| Zinc oxide | 1 |
| Sulfur | 1.5 |
| Accelerator | .5 |
| Antioxidant | .25 |
| Soap (emulsifier) | .10 |

Type 957 latex is a premium grade natural rubber latex that has had a special treatment with formaldehyde at the plantation and has had ammonia added for stability. This latex can be obtained from United States Rubber Company. The accelerator may be, for example, piperidine-pentamethylene-dithiocarbamate. It is preferred to disperse all of the ingredients except the latex in water, soap being employed as an emulsifier, and the dispersion then added to the latex.

After the form with its cement coating has been dipped in the latex dispersion to deposit on the rubber cement coating the first coating of latex, the form is dipped in a liquid coagulant. This coagulant may be, for example, a 12% solution of acetic acid in acetone. The make up of the acid solution may require change from time to time if there is a substantial change in the drying conditions. After the coagulating step, which is followed by drying, a further dip is made in the latex dispersion followed by a second coagulating and drying. The drying step is carried out while the form is in a drying atmosphere at such temperature that the glove will be vulcanized through the sulfur by external heating. The heating period may be one hour and the temperature 220° F. The glove will then be removed from the form for the usual finishing treatment.

In this example, the glove wall is constituted by an inner coating of cement rubber to which are bonded two successively applied coatings of latex rubber. Of course it is understood that a glove may readily be turned inside out, if desired, to have the cement rubber on the outside and the latex rubber on the inside.

It has been found that by this procedure the layers of the glove wall are firmly bonded together by coalescing of adjacent layers or coats. It is found, moreover, that by this procedure the inner layer of pure gum rubber can be and is fully cured throughout its area and that the glove wall, as an entity, is vulcanized satisfactorily. The latex portion of the wall is cured by the sulfur or sulfur compound in the latex dispersion. By test it has been found that the unexpected vulcanization of the innermost coat (which initially contained no vulcanizing agent) is evidently brought about by the migration to this layer of a portion of the sulfur contained in the latex dispersion. It has been found by test that where the rubber cement solution and the latex dispersion have constituents such as given in the foregoing example the finished glove contains less than one-half of one part of sulfur in the inner layer or portion which will contact the skin, the only other constituents being the pure gum rubber and the antioxidant. This provides an antiallergical inner skin or layer on the glove body. As regards the outer portion or layer of the finished glove, it is found that the sulfur content has been reduced by the migration or like effect above mentioned and that the accelerator, antioxidant and emulsifier initially in the latex dispersion do not migrate or find their way into the innermost layer or in any case do not appear there in an amount sufficient to impair appreciably the antiallergical nature of said layer.

As a further example of the outside natural latex dip, the composition may be as follows:

EXAMPLE 2

*Outside natural latex dip*

| | Parts |
|---|---|
| Type 957 latex | 70 |
| Type 401 latex | 30 |
| Zinc oxide | 1 |
| Sulfur compound | 1.5 |
| Accelerator | .05 |
| Antioxidant | .25 |
| Emulsifier | .10 |
| Color | 1 |

The type 401 latex given in this example differs from type 957 in that it has not had special formaldehyde treatment. Type 401 is another product of United States Rubber Company.

An alternative accelerator which may be used with good results in these compounds is potassiumpentamethylene dithiocarbamate.

It is clear from what has been said that the inner portion or layer of the glove wall is very pure resilient rubber. It is characterized by the absence of ingredients that are of the kind causing irritation to the skin of the wearer. This part of the glove, which is surrounded by the outer part of latex composition, serves as a protective innermost skin or stratum that creates an antiallergy glove which is particularly good for surgical use.

In making the glove as above set forth, the inner and outer portions of the wall consist principally of first quality natural rubber. This kind of rubber is the best for surgeon's gloves. In the examples given, no filler is used in either rubber composition since a filler has stiffening or other undesirable characteristics, but in some cases a small quantity of filler can be used if desired.

A small quantity of coloring matter may be used, if desired, as in the second example, without harmful effect, but it should be borne in mind that the invention is particularly adaptable to surgeon's gloves and that the requirements for such gloves, as pointed out above, are much more exacting than those which apply, for example, to nurses' gloves and household gloves. Should a very small amount of filler (for example, lithopone) be used in the latex layer, this layer will still have resilience but the resilience will be reduced in comparison to an unfilled latex layer. An outer layer devoid of filler is preferred.

While the glove made up of the described strata is a preferred form, it is to be understood that the number of dips can be varied to meet different existing conditions. For example, there might be two dips in the solution or cement instead of one, or there might be additional dips in the latex to give additional strength to the glove. These changes are mentioned only by way of example. Moreover, if desired, the rubber solution or cement as well as the latex dip can have an appropriate color imparted by the addition of coloring matter.

Surgeons' gloves made wholly of latex rubber require only one or two dips as a minimum and by the present invention only one additional dip operation is required to provide the important advantages pointed out above. Where the surgeon's glove is made wholly of cement rubber, up to eight dips are required for a satisfactory glove, and in comparison, the glove of the present invention has obvious advantages from the standpoint of production besides providing a strong durable glove having antiallergical contact with the hand. Moreover, by some phenomenon difficult to explain, the tactile sensitivity of the wall of the new glove is notably similar to that of the cement type glove. It is apparent, therefore, that by this invention are realized the objects set forth in the introductory part of this specification.

The glove shown in the drawing is of the kind described above and used as an example of the new article. It will be seen from FIGURE 2 that the inner protective layer, indicated at 10, is of less thickness than the outer latex part, indicated at 11. FIGURE 2, being diagrammatic, shows the inner and outer strata of the glove wall as separate parts but it is understood that the strata are coalesced. Though consisting of two coats or deposits, the outer stratum is shown in one piece. It is unedstood that the glove wall, of the character shown in FIGURE 2, is extended throughout the entire area of the glove. The glove has a wall thickness characteristic of a surgeon's glove of first quality, the wall thickness being about .010 inch.

While in this description of the process of manufacture the application of the coatings to the glove form is accomplished by dipping, such application may be effected by other modes such as spraying or painting. This applies also to the mode of coagulating the latex coat. Various changes in make up of the coagulating bath and in the baths used to form the glove wall may be made without departure from the principles of the invention and the scope of the claims.

The invention has been shown by way of example only, and many modifications and variations may be made therein without departing from the spirit of the invention. Therefore, it is understood that the invention is not to be limited to any specified form or embodiment except insofar as such limitations are set forth in the appended claims.

We claim:

1. A surgeons' glove having a wall comprising an outer stratum of latex rubber to impart strength and long life to the glove and an inner skin-contacting antiallergical stratum of cement-type rubber to protect the skin of the wearer of the glove from the stratum of latex rubber, said strata being cured throughout and firmly bonded to each other the outer stratum of latex containing a vulcanizing agent and the inner stratum containing lesser traces of the vulcanizing agent through migration from the outer stratum, the traces of vulcanizing agent in the inner stratum being in sufficient amount to permit curing of the inner stratum but not enough to cause irritation to the skin of the wearer.

2. An antiallergical surgeons' glove comprising an inner protective layer of essentially pure resilient rubber which will inhibit irritation of the wearer's skin, said layer being thin and in the nature of a skin to be drawn over the hand and having touch sensitivity for delicate manipulations, and an outer and somewhat thicker layer of latex rubber enclosing said first layer substantially throughout the glove wall and firmly bonded to said first layer, said outer layer imparting strength and long life to the glove, the outer stratum of latex containing a vulcanizing agent and the inner stratum containing lesser traces of the vulcanizing agent through migration from the outer stratum, the traces of vulcanizing agent in the inner stratum being in sufficient amount to permit curing of the inner stratum but not enough to cause irritation to the skin of the wearer.

3. An antiallergical surgeons' glove comprising an inner protective layer of dry para type natural rubber and an antioxidant, said inner layer being thin and in the nature of a skin to be drawn over the hand and having touch sensitivity for delicate manipulations, and an outer layer of premium grade natural rubber latex treated with formaldehyde and ammonia, said outer layer imparting strength and long life to the glove, the outer stratum of latex containing a vulcanizing agent and the inner stratum containing lesser traces of the vulcanizing agent through migration from the outer stratum, the traces of vulcanizing agent in the inner stratum being in sufficient amount to permit curing of the inner stratum but not enough to cause irritation to the skin of the wearer.

4. An antiallergical surgeons' glove comprising an inner protective layer of dry para type natural rubber and an antioxidant, said inner layer being thin and in the nature of a skin to be drawn over the hand and having touch sensitivity for delicate manipulations, an outer layer of premium grade natural rubber latex treated with formaldehyde and ammonia, and a liquid coagulant deposited over said outer layer, said outer layer imparting strength and long life to the glove, the outer stratum of latex containing a vulcanizing agent and the inner stratum containing lesser traces of the vulcanizing agent through migration from the outer stratum, the traces of vulcanizing agent in the inner stratum being in sufficient amount to permit curing of the inner stratum but not enough to cause irritation to the skin of the wearer.

5. An antiallergical surgeons' glove comprising an inner protective layer of dry para type natural rubber and an antioxidant, said inner layer being thin and in the nature of a skin to be drawn over the hand and having touch sensitivity for delicate manipulations, an outer layer of premium grade natural rubber latex treated with formaldehyde, ammonia and sulfur, and said outer layer being thicker than said inner layer and firmly bonded thereto, said outer layer imparting strength and long life to the glove and the outer stratum of latex containing a vulcanizing agent and the inner stratum containing lesser traces of the vulcanizing agent through migration from the outer stratum, the traces of vulcanizing agent in the inner stratum being in sufficient amount to permit curing of the inner stratum but not enough to cause irritation to the skin of the wearer.

References Cited in the file of this patent

UNITED STATES PATENTS

| | | |
|---|---|---|
| 732,360 | Lindsay | June 30, 1903 |
| 1,165,198 | Miller | Dec. 21, 1915 |
| 1,518,062 | Glancy | Dec. 2, 1924 |
| 1,573,093 | Russell et al. | Feb. 16, 1926 |
| 1,797,240 | Newton | Mar. 24, 1931 |
| 2,128,827 | Killian | Aug. 30, 1938 |
| 2,174,943 | Keiser et al. | Oct. 3, 1939 |
| 2,266,716 | Robertson | Dec. 16, 1941 |
| 2,297,787 | Locke | Oct. 6, 1942 |
| 2,325,330 | Lewis | July 27, 1943 |
| 2,326,160 | Neiley et al. | Aug. 10, 1943 |
| 2,453,604 | Tenenbaum et al. | Nov. 9, 1948 |